(12) United States Patent
Aritake et al.

(10) Patent No.: US 8,184,236 B2
(45) Date of Patent: May 22, 2012

(54) LIGHTING DEVICE AND LIQUID CRYSTAL DISPLAY DEVICE

(75) Inventors: Hirokazu Aritake, Kawasaki (JP); Satoshi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 12/197,594

(22) Filed: Aug. 25, 2008

(65) Prior Publication Data

US 2008/0309847 A1    Dec. 18, 2008

Related U.S. Application Data

(63) Continuation of application No. PCT/JP2006/303556, filed on Feb. 27, 2006.

(51) Int. Cl.
*G02F 1/1335* (2006.01)

(52) U.S. Cl. ............... 349/65; 362/615; 362/621

(58) Field of Classification Search ............ None
See application file for complete search history.

(56) References Cited

U.S. PATENT DOCUMENTS

| | | | |
|---|---|---|---|
| 5,961,197 A | 10/1999 | Watai et al. | |
| 6,585,356 B1 | 7/2003 | Ohkawa | |
| 6,935,764 B2 | 8/2005 | Choi et al. | |
| 6,976,779 B2 * | 12/2005 | Ohtsuki et al. | 362/608 |
| 7,001,035 B2 | 2/2006 | Kawakami | |
| 2003/0117792 A1 | 6/2003 | Kunimochi et al. | |
| 2004/0130880 A1 * | 7/2004 | Min et al. | 362/31 |
| 2005/0030730 A1 | 2/2005 | Ohkawa et al. | |
| 2006/0082884 A1 * | 4/2006 | Feng et al. | 359/569 |
| 2006/0181903 A1 * | 8/2006 | Okuwaki | 362/619 |

FOREIGN PATENT DOCUMENTS

| | | |
|---|---|---|
| EP | 1146379 A1 | 10/2001 |
| JP | 09-160036 A | 6/1997 |
| JP | 2000-356757 A | 12/2000 |
| JP | 2002-075038 A | 3/2002 |
| JP | 2002-093232 A | 3/2002 |
| JP | 2002-228847 A | 8/2002 |
| JP | 2002-357823 A | 12/2002 |
| JP | 2003-115209 A | 4/2003 |
| JP | 2003-197019 A | 7/2003 |
| JP | 2003-331628 A | 11/2003 |
| JP | 2004-79461 A | 3/2004 |
| JP | 2004-163886 A | 10/2004 |
| JP | 2004-355883 A | 12/2004 |
| TW | 584760 B | 4/2004 |

OTHER PUBLICATIONS

Taiwanese Office Action dated Dec. 14, 2009, issued in corresponding Taiwan Patent Application No. 95107747.
International Search Report issued Mar. 28, 2008 in corresponding International Application No. PCT/JP2006/303556.

(Continued)

*Primary Examiner* — Thanh-Nhan P. Nguyen
(74) *Attorney, Agent, or Firm* — Fujitsu Patent Center

(57) ABSTRACT

LEDs (light sources) are disposed in a row in the width direction of a light-guiding plate near the edge surface of the light-guiding plate. In the edge surface of the light-guiding plate, diffractive optical elements (DOEs) are disposed to face the LEDs, respectively. These DOEs are constituted of binary concave and convex patterns, and the diffusion angle of the DOEs disposed near the center is set smaller than that of the other DOEs disposed near the edge.

9 Claims, 15 Drawing Sheets

OTHER PUBLICATIONS

Korean Office Action dated Feb. 22, 2010, issued in corresponding Korean Patent Application No. 10-2008-70023553.
Chinese Office Action dated Aug. 14, 2009, issued in corresponding Chinese Patent Application No. 2006800534290.
"Korean Office Action" mailed by Korean Patent Office and corresponding to Korean application No. 10-2011-7003059 on Mar. 11, 2011, with English translation.

* cited by examiner

FIG. 13A
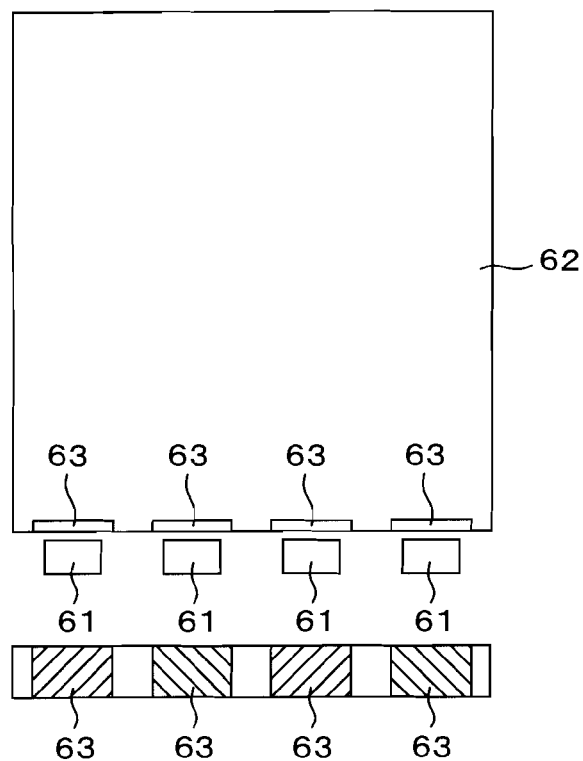
FIG. 13B
FIG. 14A
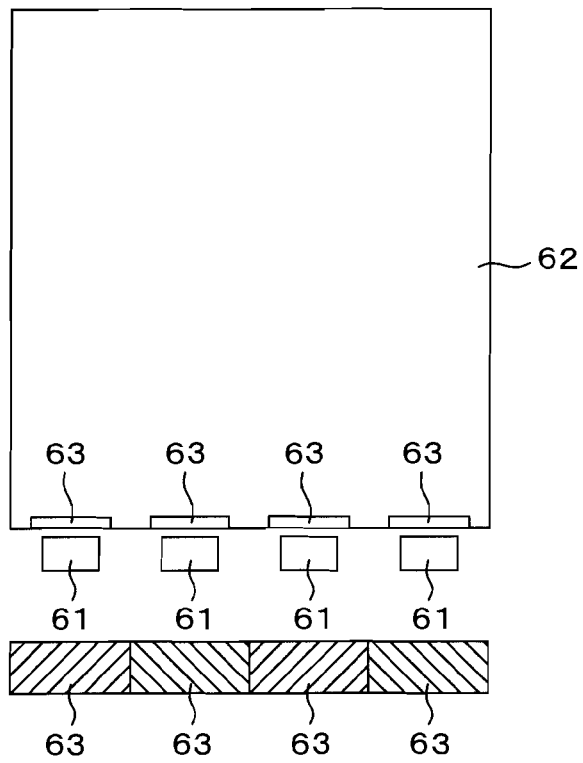
FIG. 14B

LIGHTING DEVICE AND LIQUID CRYSTAL DISPLAY DEVICE

CROSS-REFERENCE TO RELATED APPLICATIONS

This application is a continuation of prior International Patent Application No. PCT/JP2006/303556, filed Feb. 27, 2006, the entire contents of which are incorporated herein by reference.

BACKGROUND

1. Field

The present invention relates to a lighting device including a light source and a light-guiding plate, and a liquid crystal display device using the lighting device.

2. Description of the Related Art

Liquid crystal display devices have been widely used for electronic devices such as mobile phones and personal digital assistants (PDA) because of their thinness, light weight, and small power consumption. A lighting device called a backlight is usually disposed in the liquid crystal display devices used for such electronic devices.

FIG. 1 is a schematic diagram showing an example of a conventional liquid crystal display device. As shown in FIG. 1, the liquid crystal display device includes a liquid crystal panel 10, and a backlight 20 disposed on the back surface side of the liquid crystal panel 10.

The liquid crystal panel 10 is formed of two transparent substrates 11a and 11b, as well as a liquid crystal 12 that is sealed between the transparent substrates 11a and 11b. Polarizing plates (not shown) are disposed on both sides of the liquid crystal panel 10 in a thickness direction thereof.

The backlight 20 includes light emitting diodes (LED) 21 serving as light sources, a light-guiding plate 22, a reflective sheet 23, and a prism sheet 24. The LEDs 21 are disposed at one edge surface side of the light-guiding plate 22. In the case of a 2-inch liquid crystal panel, three or four LEDs 21 are used in general.

The light-guiding plate 22 is made of a transparent resin, and is formed to have a wedge-shaped cross section as shown in FIG. 1. The reflective sheet 23 is disposed on a back surface side of the light-guiding plate 22, and the prism sheet 24 is disposed on a front surface side (liquid crystal panel 10 side).

In the liquid crystal display device configured in such a manner, light emitted from the LEDs 21 enters the light-guiding plate 22, is reflected by the reflective sheet 23, and is emitted toward the liquid crystal panel 10.

A pixel electrode is formed for each pixel in one of the two transparent substrates 11a and 11b constituting the liquid crystal panel 10, and a common electrode is formed in the other substrate to face these pixel electrodes. An amount of light transmitted through the pixels can be controlled by voltage applied between the respective pixel electrodes and the common electrode. Thus, the controlling of a light transmission amount for each pixel allows a desired image to be displayed.

In the liquid crystal display device, light emitted from the backlight 20 preferably causes an entire surface of the liquid crystal panel 10 to be illuminated uniformly. Accordingly, the fine concave and convex portions are formed on the front surface side or the back surface side of the light-guiding plate 22 to disperse the light more uniformly, or the prism sheet 24 is placed as a light distribution control plate between the light-guiding plate 22 and the liquid crystal panel 10 as shown in FIG. 1.

However, if only the LEDs 21 are disposed near the edge surface of the light-guiding plate 22 as shown in FIG. 1, uneven brightness occurs on the inner side of the light-guiding plate to cause a problem of reduction in quality of an image displayed in the liquid crystal display device. FIG. 2 is a plan view when the backlight 20 is viewed from the liquid crystal panel 10 side. As shown in FIG. 2, a plurality of LEDs 21 are generally used for the liquid crystal display device. However, if only the LEDs 21 are disposed near the edge surface of the light-guiding plate 22, light does not reach a region between adjacent LEDs 21, resulting in dark portions (portions indicated by A in FIG. 2) and portions of high luminance (portions indicated by B in FIG. 2) near the front of the LEDs 21.

Various techniques have conventionally been developed to solve the aforementioned problems. For example, a Patent Document 1 (Japanese Laid-open Patent Application Publication No. 2004-163886) discloses a lighting device in which concave lenses are disposed between a light-guiding plate and each of light sources. In this lighting device, the light emitted from the light sources is refracted by the concave lenses. Thus, occurrence of uneven brightness near the edge surface on the inner side of the light-guiding plate can be avoided. Moreover, in a Patent Document 2 (Japanese Laid-open Patent Application Publication No. 2002-357823), as shown in FIG. 3A, a light-guiding plate 26 having a semicircular notch formed in a portion corresponding to an LED 21 is described. In this light-guiding plate 26, light emitted from the LEDs 21 is refracted by the notch. Thus, the light reaches a region between adjacent LEDs 21 to prevent uneven brightness near the edge surface of the light-guiding plate.

Further, in a Patent Document 3 (Japanese Laid-open Patent Application Publication No. 2003-331628), as shown in FIG. 3B, formation of many prisms (triangular concave and convex portions) 27a in an entire edge surface of an LED side of a light-guiding plate 27 is described. In this light-guiding plate 27, light emitted from LEDs 21 is refracted by the prism 27a. Thus, the light reaches a region between adjacent LEDs 21 to suppress uneven brightness near the edge surface of the light-guiding plate.

Furthermore, as shown in FIG. 3C, there is a light-guiding plate 28 having fine concave and convex portions formed in an edge surface of its LED side. Such fine concave and convex portions are formed by blast processing with a mold block. In the light-guiding plate 28, light emitted from LEDs 21 is dispersed by the fine concave and convex portions when the light enters the light-guiding plate, and reaches a region between adjacent LEDs 21 to prevent uneven brightness near the edge surface of the light-guiding plate.

FIG. 4 is a schematic diagram showing a method of manufacturing the light-guiding plate 28 shown in FIG. 3C. As shown in FIG. 4, concave and convex portions are formed on a surface by injecting sand (abrasive grains) through a nozzle 42 to a mold block 41. At this time, concave and convex patterns can be changed by adjusting a material, a particle size, an injecting speed, an injecting amount, an injecting angle or the like of the sand. Next, the light-guiding plate 28 is molded by use of the mold block 41. Subsequently, an LED, a reflective sheet, a prism sheet and the like are mounted to the light-guiding plate 28 to constitute a backlight, and an optical characteristic (uniformity) is evaluated with the LED turned on. Then, if a desired optical characteristic is not obtained, blast processing is performed again by changing conditions.

Note that, in a Patent Document 4 (Japanese Laid-open Patent Application Publication No. 2000-356757), a projector in which two diffractive optical elements including a liquid crystal and a polymer are disposed between a light source and a lens to obtain a light beam having a uniform polarization direction is described.

However, in the lighting device using the light-guiding plate 26 shown in FIG. 3A, the LED 21 and the semicircular notch must be fairly accurately aligned with each other. The device lacks versatility because the number and positions of LEDs 21 are determined by the notch of the light-guiding plate 26. Thus, it is not easy to deal with changes in panel size.

In the same manner as the lighting device shown in FIG. 3A, the lighting device described in the Patent Document 1 has a problem that the light sources and the concave lenses must be fairly accurately aligned with each other. Since the concave lens is disposed between the light source and the light-guiding plate, there arises another problem that a large space needs to be secured between the light-guiding plate and each of the light sources whereby leakage light not entering the light-guiding plate increases, leading to a decrease in light usage efficiency.

The lighting device using the light-guiding plate 27 shown in FIG. 3B also requires the LED 21 and the prism 27a to be fairly accurately aligned with each other. A certain distance is necessary between the LED 21 and the light-guiding plate 27 to effectively use the prism 27a. Thus, leakage light not entering the light-guiding plate 27 increases to reduce light usage efficiency.

In the light-guiding plate 28 shown in FIG. 3C, fairly accurate alignment is not necessary because of the formation of the fine concave and convex portions in the entire edge surface on the LED side. However, the concave and convex portions exhibiting desired characteristics must be formed by repeating the blast processing for the mold block, the molding and the optical evaluation. Thus, there is a drawback that the mold manufacturing takes time. In the case of a mobile phone, many molds are necessary because there are many manufacturing steps. However, reproducibility of concave and convex portions formed by the blast processing is low, causing a problem of nonuniform mold qualities, which in turn causes an increase in manufacturing cost.

Further, conventional lighting devices have been designed to uniformly illuminate an entire surface of a liquid crystal panel, as described above. However, in recent years, lighting devices used for mobile phones and PDAs in particular are desired to be capable of approximately uniformly illuminating an entire surface of a liquid crystal panel, as well as to be easily designable in accordance with the desired brightness distribution, such as high brightness in the center portion or high brightness in the peripheral portions.

SUMMARY

According to an aspect of an embodiment, there is a lighting device including a light-guiding plate by which light entering from an edge surface is outputted in a thickness direction of the light-guiding plate, a plurality of light sources disposed near the edge surface of the light-guiding plate and aligned in the width direction of the light-guiding plate, and a plurality of diffractive optical elements disposed in the edge surface of the light-guiding plate to face the light sources, respectively, wherein, among the plurality of diffractive optical elements, the diffusion angle of the diffractive optical elements which are disposed near the center differs from the diffusion angle of the diffractive optical elements which are disposed near the edge.

BRIEF DESCRIPTION OF THE DRAWINGS

FIG. 13A is a plan view showing an example in which DOEs are spaced.

FIG. 13B is a side view as well.

FIG. 14A is a plan view showing an example in which DOEs are disposed in conjunction with each other.

FIG. 14B is a side view as well.

DETAILED DESCRIPTION OF THE PREFERRED EMBODIMENTS (First Embodiment)

Figure 1:
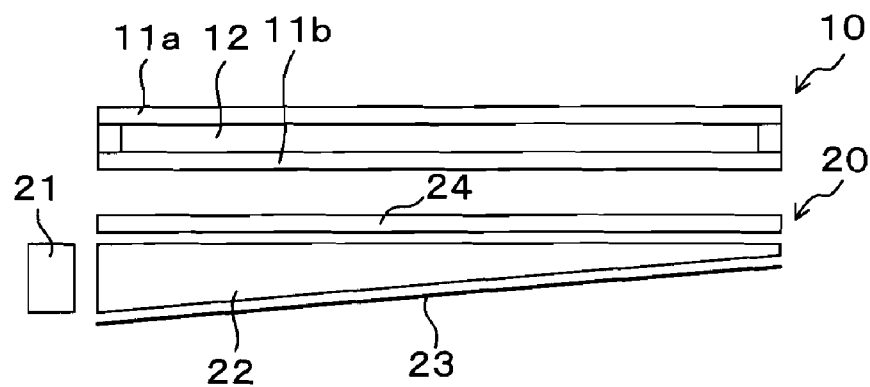
FIG. 1 is a schematic diagram showing an example of a conventional liquid crystal display device.
Figure 2:
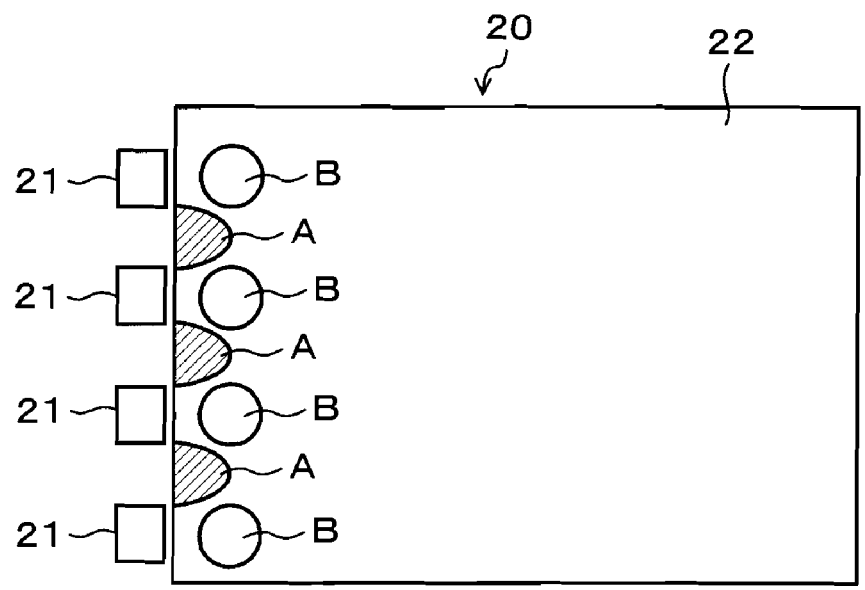
FIG. 2 is a plan view when a conventional lighting device (backlight) is viewed from a liquid crystal panel side.
Figure 3A:
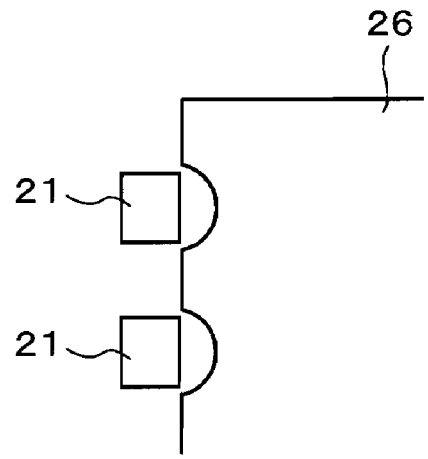
FIGS. 3A to 3C are schematic diagrams showing examples of conventional backlights.
Figure 3B:
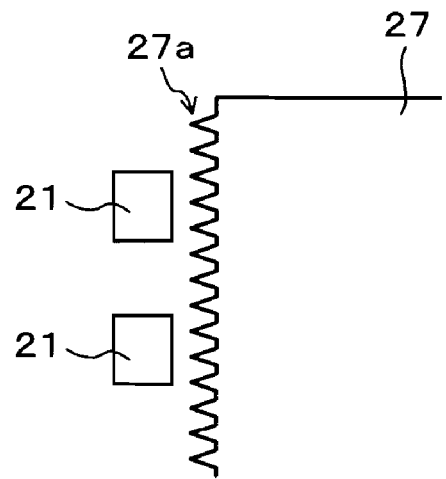
Figure 3C:
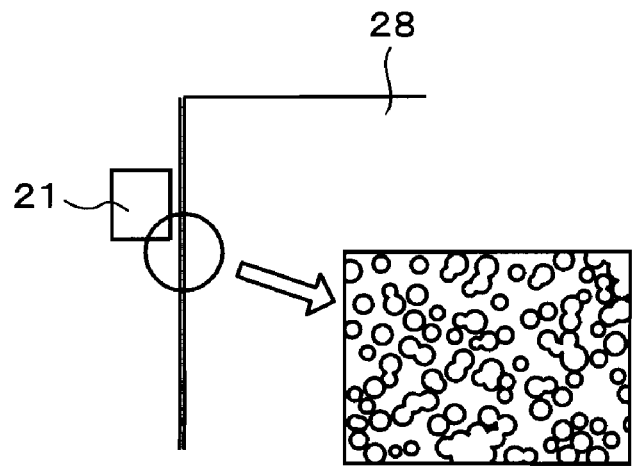
Figure 4:
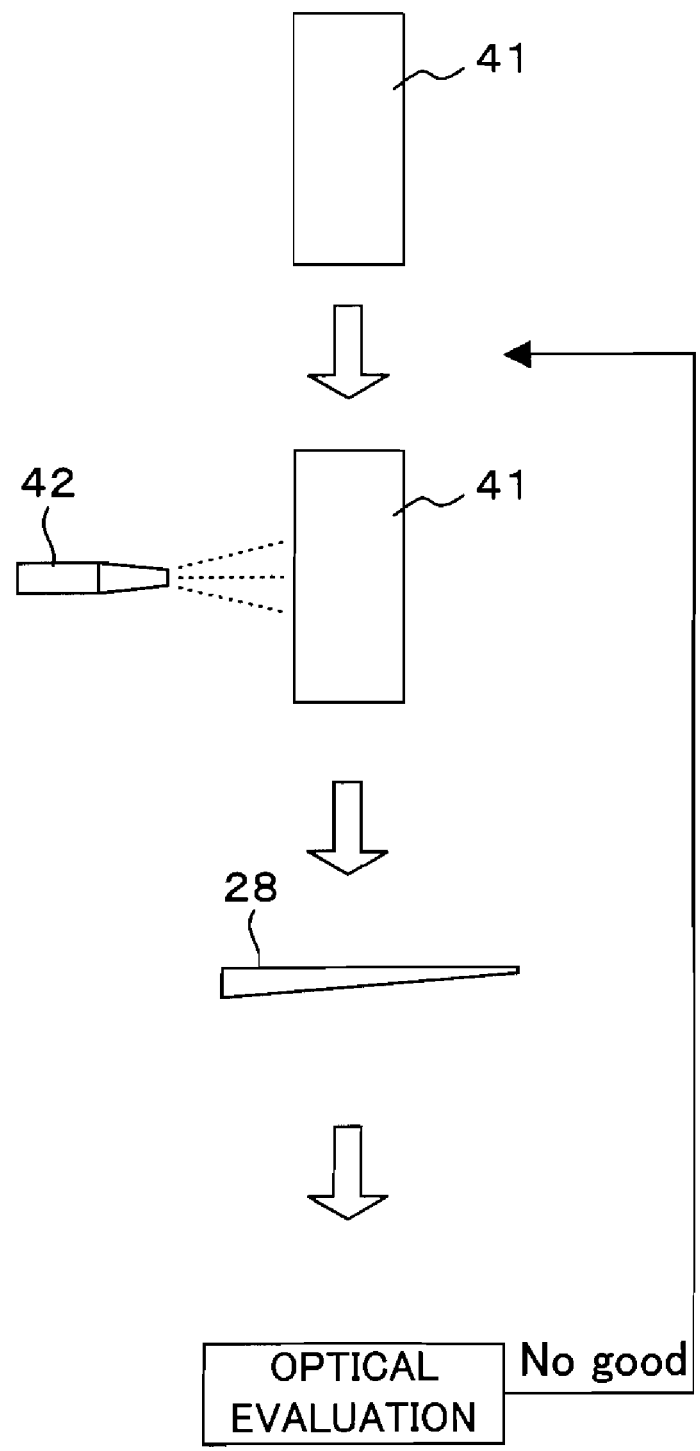
FIG. 4 is a schematic diagram showing a method of manufacturing a light-guiding plate of the backlight shown in FIG. 3C.
Figure 5:
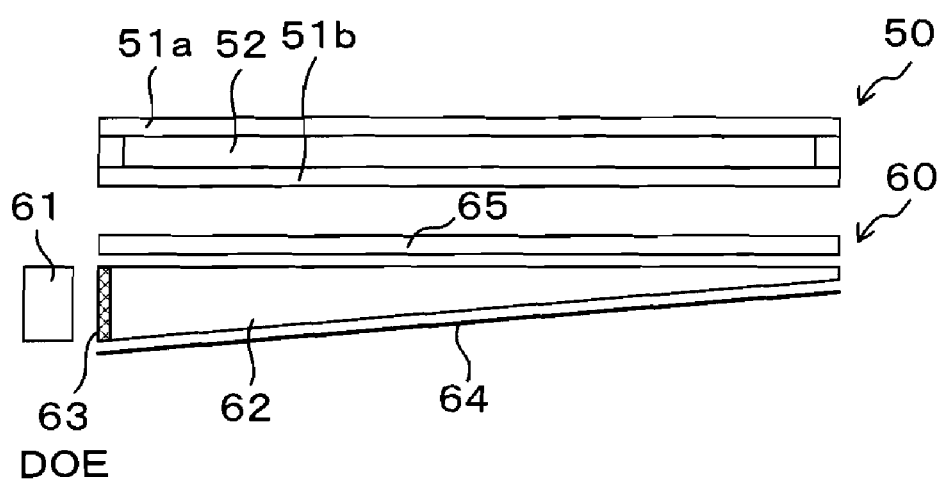
FIG. 5 is a schematic diagram showing a liquid crystal display device using a lighting device according to a first embodiment.

FIG. 5 is a schematic diagram showing a liquid crystal display device which uses a lighting device according to a first embodiment. As shown in FIG. 5, the liquid crystal display device includes a liquid crystal panel 50, and a backlight (lighting device) 60 disposed on a back surface side of the liquid crystal panel 50.

The liquid crystal panel 50 is formed two transparent substrates 51a and 11b, as well as a liquid crystal 52 that is sealed between the transparent substrates 11a and 11b. Polarizing plates (not shown) are disposed on both sides of the liquid crystal panel 50 in a thickness direction thereof. The size of the liquid crystal panel 50 is, for example, 2 to 4 inches.

The backlight 60 includes a plurality of LEDs 61 as light sources, a light-guiding plate 62, a reflective sheet 64, and a prism sheet 65. The LEDs 61 are disposed along one edge surface of the light-guiding plate 62.

The light-guiding plate 62 is made of a transparent resin of polymethyl methacrylate (PMMA) or the like, and is formed to have a wedge-shaped cross section as shown in FIG. 5. The size of the light-guiding plate 62 is substantially equal to that of the liquid crystal panel 50, and the thickness at an end on an LED side is about 1 mm. The reflective sheet 64 is disposed on a back surface side of the light-guiding plate 62, while the prism sheet 65 as a light distribution control plate is disposed on a front surface side (liquid crystal panel 50 side). A diffusion sheet and a brightness enhancement film (BFT) may be used instead of the prism sheet 65.

A DOE 63 constituted of a binary concave and convex pattern distributed in two-dimensional directions (i.e., a concave and convex pattern in which the level differences between the uppermost surface and the lowermost surface are uniform) is formed in an edge surface on the LED side of the light-guiding plate 62. By this DOE 63, light emitted from the LED 61 is diffused or diffracted when it enters the light-guiding plate 62 to prevent uneven brightness near the edge surface of the light-guiding plate.

Figure 6A:
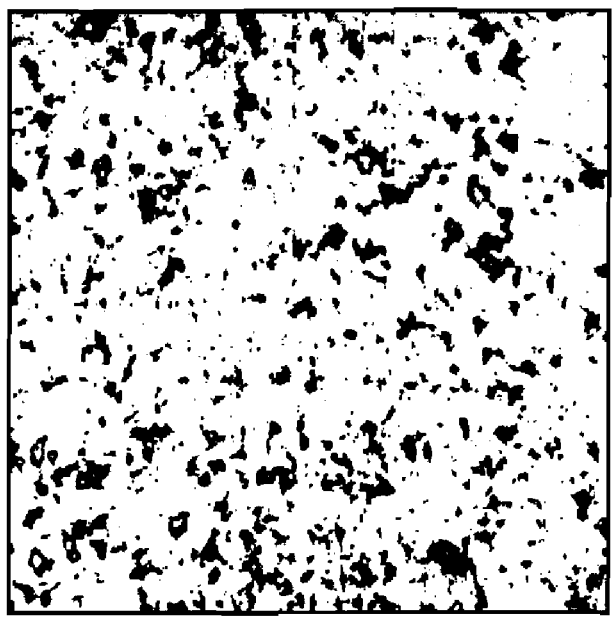
FIG. 6A is a plan view showing a DOE of the lighting device of the first embodiment.
Figure 6B:
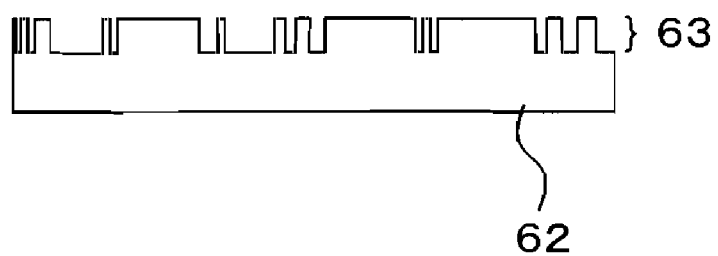
FIG. 6B is a schematic diagram showing the cross section of the DOE.

FIG. 6A is a plan view showing the DOE 63, and FIG. 6B is a schematic diagram showing a cross section as well. In FIG. 6A, a white portion is a convex portion, and a black portion is a concave portion. The depth of the concave portion (or the height of the convex portion) in this embodiment is, for example, 0.4 μm to 0.7 μm. An area ratio of the convex portion (area of a convex portion/(area of a convex portion+area of a concave portion)) of the DOE 63 is preferably 30% to 70%. More preferably, the area ratio of the convex portion is 40% to 60%. The concave and convex pattern of the DOE 63 is obtained by optimizing the concave and convex pattern so as to exhibit desired diffusion characteristics or diffraction characteristics by an existing Gerchberg-Saxton method or simulated annealing method.

Figure 7:
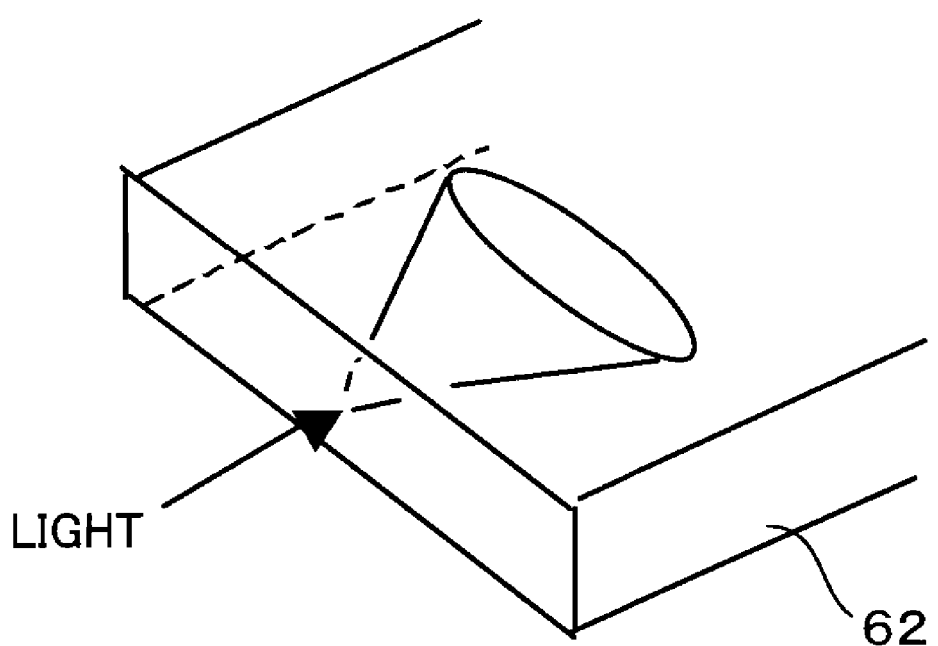
FIG. 7 is a schematic diagram showing a diffusion distribution of the DOE.
Figure 8:
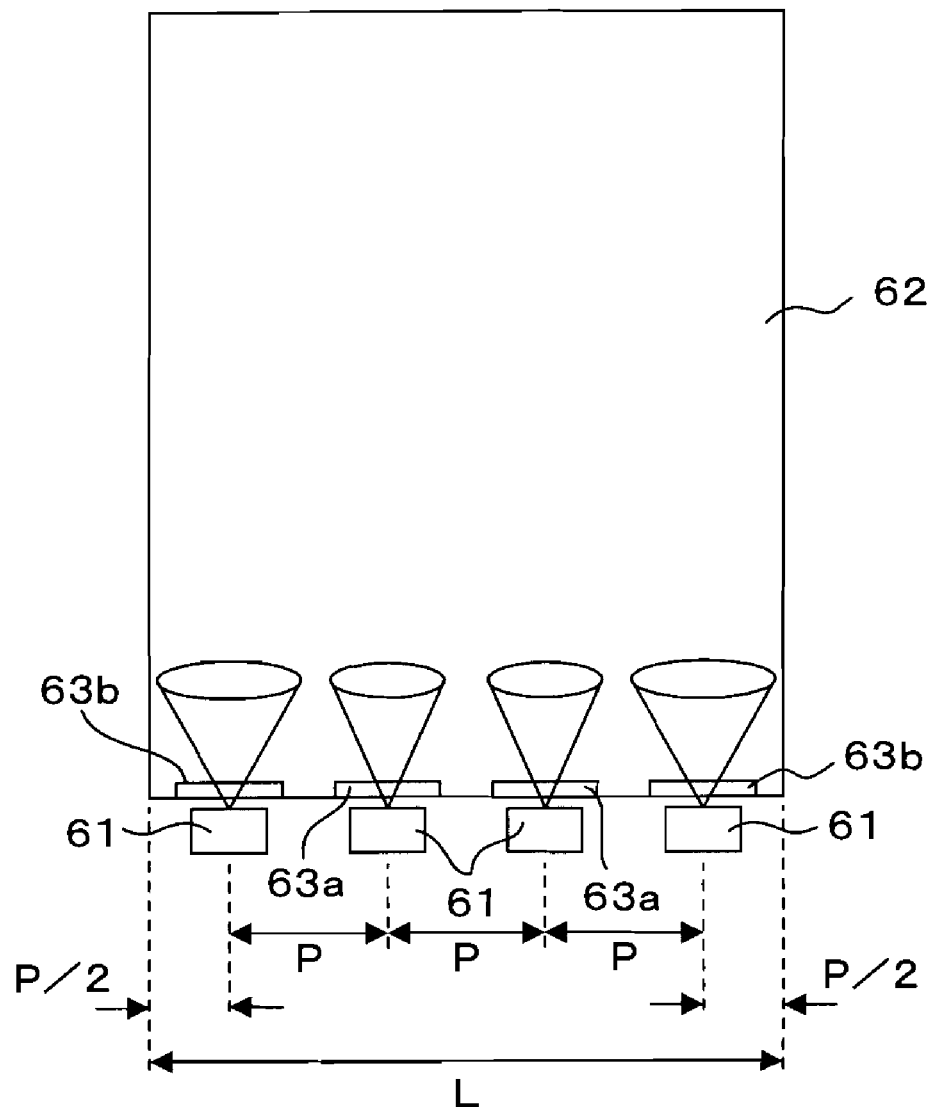
FIG. 8 is a schematic diagram showing arrangements of LEDs and the DOEs, and the diffusion angle of each DOE according to the first embodiment.

According to this embodiment, four LEDs 61 and four DOEs 63 are provided to face each other on an edge surface side of the light-guiding plate 62. As schematically shown in FIG. 7, the concave and convex pattern of the DOEs 63 is optimized so that a diffusion distribution shows an oval shape or a rectangular shape with the short axis being in the thickness direction of the light-guiding plate 62 and the long axis being in the width direction. In this embodiment, as schematically shown in FIG. 8, diffusion angles of the four DOEs are not uniform, and the diffusion angle of the two DOEs (DOEs 63a in FIG. 8) disposed near the center are set smaller than the diffusion angles of the other two DOEs 63 (DOEs 63b in FIG. 8) disposed near the edge. When the width of the light-guiding plate 62 is represented by L and the number of the LEDs 61 is represented by n (n=4 in this example), the interval between the centers of the LEDs is set to be P (P=L/n) and the interval between the edge of the light-guiding plate 62 and the center of the LED 61 disposed near the edge is set to be P/2. The reason for making the diffusion angle of the DOEs 63a smaller than that of the DOEs 63b is described below.

Figure 9:
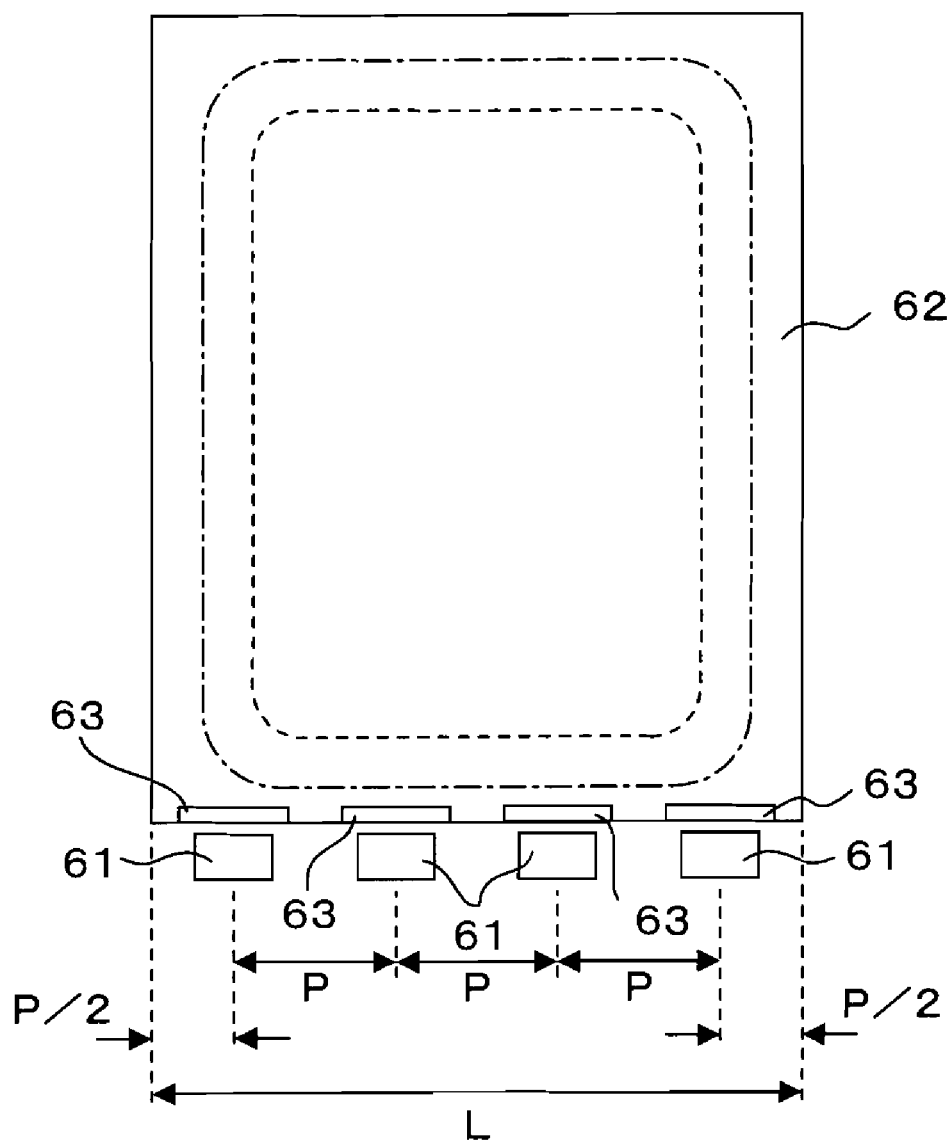
FIG. 9 is a schematic diagram showing a preferable arrangement of the LEDs in terms of uniformizing a brightness distribution within a surface of the lighting device.

In terms of uniformizing the brightness distribution within the surface of the lighting device, it is preferable to arrange the LEDs 61 as shown in FIG. 9. In FIG. 9, L represents the width of the light-guiding plate 62, and P represents the interval between the centers of the LEDs 61. The interval between the center of the LED 61 disposed near the edge and the edge of the light-guiding plate 62 is P/2. When the LEDs 61 are disposed as shown in FIG. 9 and the diffusion angles of the DOEs 63 are all the same, the brightness in the center portion (inner side portion of the dotted line in FIG. 9) of the lighting device is reduced. On the other hand, by making the diffusion angle of the DOEs 63a disposed near the center smaller than that of the DOEs 63b disposed near the edge as shown in FIG. 8, the brightness of the center portion of the lighting device can be improved without substantially degrading the uniformity of the brightness distribution within the surface of the lighting device. As a result, a liquid crystal display device with a bright screen and a good visibility can be achieved.

Figure 10A:
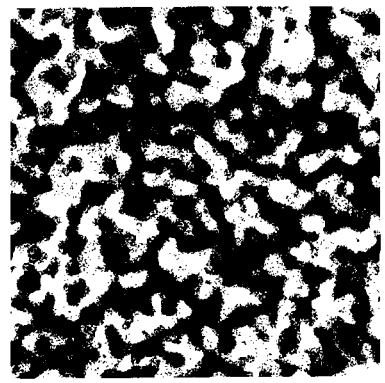
FIGS. 10A and 10B are diagrams showing examples of concave and convex patterns of the DOE designed using a Gerchberg-Saxton method or a simulated annealing method.
Figure 10B:
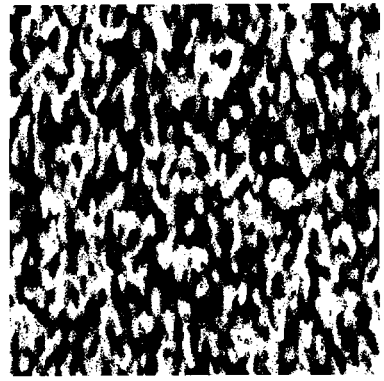

Each of the patterns of the DOEs 63a and 63b resulting in a different diffusion angle may be designed separately. FIG. 10A shows an example of a concave and convex pattern of the DOEs 63a designed using the Gerchberg-Saxton method or the simulated annealing method, and FIG. 10B shows an example of a concave and convex pattern of the DOEs 63b designed using the Gerchberg-Saxton method or the simulated annealing method so that the diffusion angle of the DOEs 63a is doubled. The concave and convex pattern of FIG. 10B differs in pattern shape from the concave and convex pattern of FIG. 10A, and the DOEs 63b are formed by arranging the concave and convex pattern shown in FIG. 10B at the same pitch as that of the concave and convex pattern shown in FIG. 10A. The diffusion angle of the DOEs 63b formed in such a manner is twice the diffusion angle of the DOEs 63a having the concave and convex pattern shown in FIG. 10A.

Figure 11A:
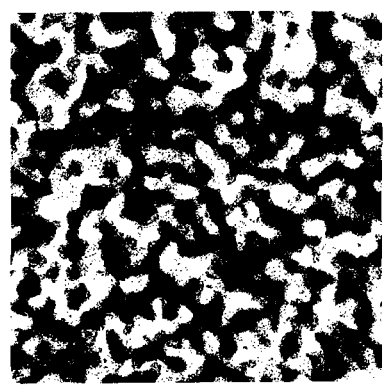
FIG. 11A is a diagram showing an example of the concave and convex pattern of the DOE designed using a Gerchberg-Saxton method or a simulated annealing method.
Figure 11B:
FIG. 11B is a diagram showing a compression pattern with a horizontal pitch being ½ of that of the concave and convex pattern of the DOE shown in FIG. 11A.
Figure 11C:
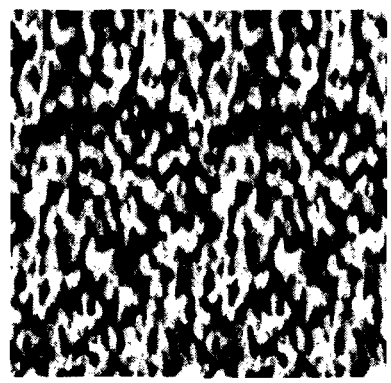
FIG. 11C is a diagram showing a concave and convex pattern of the DOE formed by repeatedly arranging the compression pattern shown in FIG. 11B in the horizontal direction.

Alternatively, one group of the DOEs 63 may be designed using the Gerchberg-Saxton method or the simulated annealing method, while the pattern of the other group of the DOEs 63 is determined by changing the pitch of the pattern of the former group of the DOEs 63. FIG. 11A shows an example of the concave and convex pattern of the DOEs 63a designed using the Gerchberg-Saxton method or the simulated annealing method, FIG. 11B shows a compression pattern with the horizontal pitch being ½ of that of the concave and convex pattern of the DOEs 63a, and FIG. 11C shows a concave and convex pattern formed for the DOEs 63b by repeatedly arranging the compression pattern of FIG. 11B in the horizontal direction. The diffusion angle of the DOEs 63b having the concave and convex pattern shown in FIG. 11C is twice the diffusion angle of the DOEs 63a having the concave and convex pattern shown in FIG. 11A.

FIGS. 12A to 12E are schematic diagrams showing a method of manufacturing a mold used for manufacturing the DOEs 63.

First, a reticle (exposure mask) with a desired concave and convex pattern drawn (for example, pattern shown in FIG. 10A or FIG. 10B) is prepared.

Figure 12A:
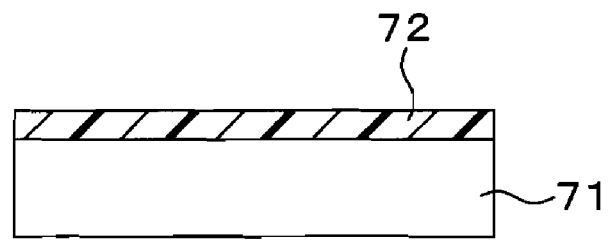
FIGS. 12A to 12E are schematic diagrams showing a method of manufacturing a mold used for manufacturing the DOE.
Figure 12B:
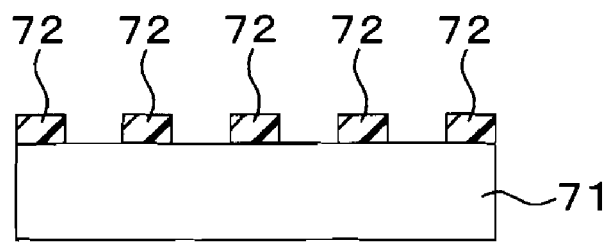

Next, as shown in FIG. 12A, a silicon substrate 71 is coated with a photoresist to form a photoresist film 72. Then, stepper exposure (reduction exposure) is performed by using the prepared reticle. Development is subsequently carried out to transfer the concave and convex pattern of the reticle to the resist film 72 as shown in FIG. 12B.

Figure 12C:
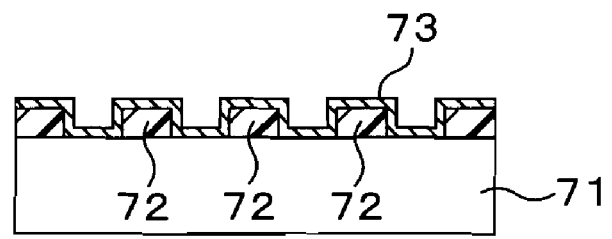
Figure 12D:
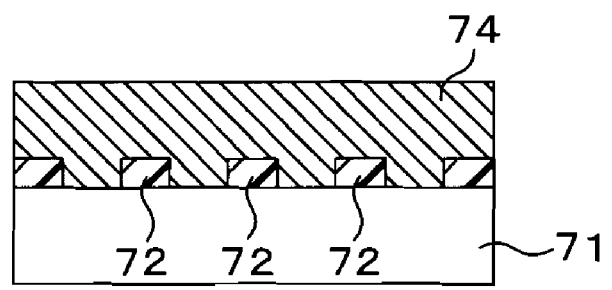

Next, as shown in FIG. 12C, nickel (Ni) is sputtered on an entire upper surface of the silicon substrate 71 to form a base film 73. Subsequently, as shown in FIG. 12D, the base film 73 is electrolytically plated with Ni till a sufficient thickness is achieved to form a metal block 74.

Figure 12E:
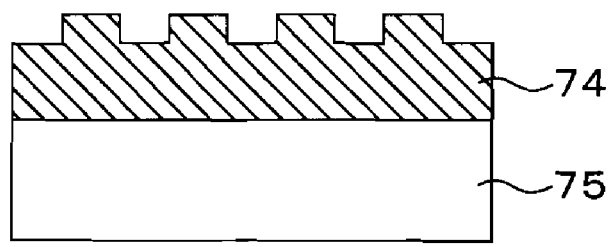

Next, as shown in FIG. 12E, the metal block 74 is removed from the silicon substrate 71, processed into a predetermined outer shape, and then joined with a reinforcing plate 75 to complete a mold. However, when the metal block 74 has sufficient strength, the metal block 74 may be formed as a mold without joining it with the reinforcing plate 75.

The mold having a concave and convex pattern thus formed is combined with another mold. Then, a transparent resin of PMMA or the like is injected into a space formed by the molds to form the light-guiding plate 62 having the DOEs 63.

As described above, according to this embodiment, since the light emitted from the LED 61 is diffused by the DOEs 63 composed of the binary concave and convex pattern, uneven brightness near the edge surface of the light-guiding plate 62 is prevented, and the entire liquid crystal panel 50 is uniformly irradiated with the light. This exerts an effect that a good quality image can be displayed in the liquid crystal display device.

Furthermore, in this embodiment, the concave and convex pattern of the mold for forming the DOEs is formed by the photolithography method and the plating method. Accordingly, mold manufacturing is easier compared with the conventional method of forming the concave and convex pattern by the blast processing, and uniform and high quality lighting device can be mass-produced. This exerts an effect that manufacturing costs of the lighting device for the liquid crystal display device can be reduced.

Further, in this embodiment, since light is diffracted or diffused by the DOEs 63 provided in the edge surface of the light-guiding plate 62, the LEDs 61 can be disposed closer to the light-guiding plate 62. Thus, leakage light can be reduced, and the light usage efficiency is improved.

Furthermore, in this embodiment, since the diffusion angle of the DOEs 63a disposed near the center is set smaller than the diffusion angle of the DOEs 63b disposed near the edge, the brightness of the center portion of the lighting device can be improved without substantially degrading the uniformity of the brightness distribution of the lighting device. This exerts an effect that a liquid crystal display device with a bright screen and a good visibility can be achieved.

The DOEs 63 are spaced in this embodiment as shown in FIGS. 13A and 13B, but the DOEs 63 may be connected as shown in FIGS. 14A and 14B.

Figure 15:
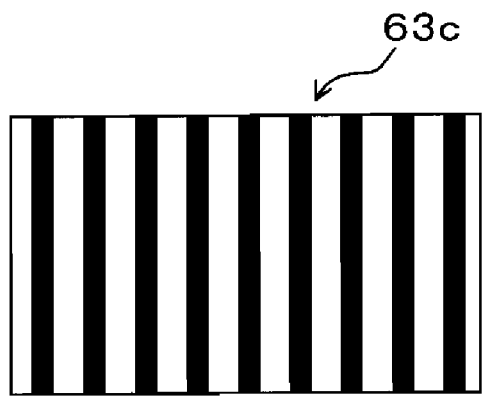
FIG. 15 is a schematic diagram showing a one-dimensional diffraction grating type DOE.

In the first embodiment above, description has been given of the case where the concave and convex pattern of the DOEs 63 is distributed in two-dimensional directions. However, a DOEs 63c having a one-dimensional diffraction grating concave and convex pattern as shown in FIG. 15. In FIG. 15, a white portion shows a convex portion, and a black portion shows a concave portion. The one-dimensional diffraction grating concave and convex pattern is determined by optimizing a concave and convex pattern by, e.g. a Rigorous Coupled-Wave Analysis method.

Figure 16:
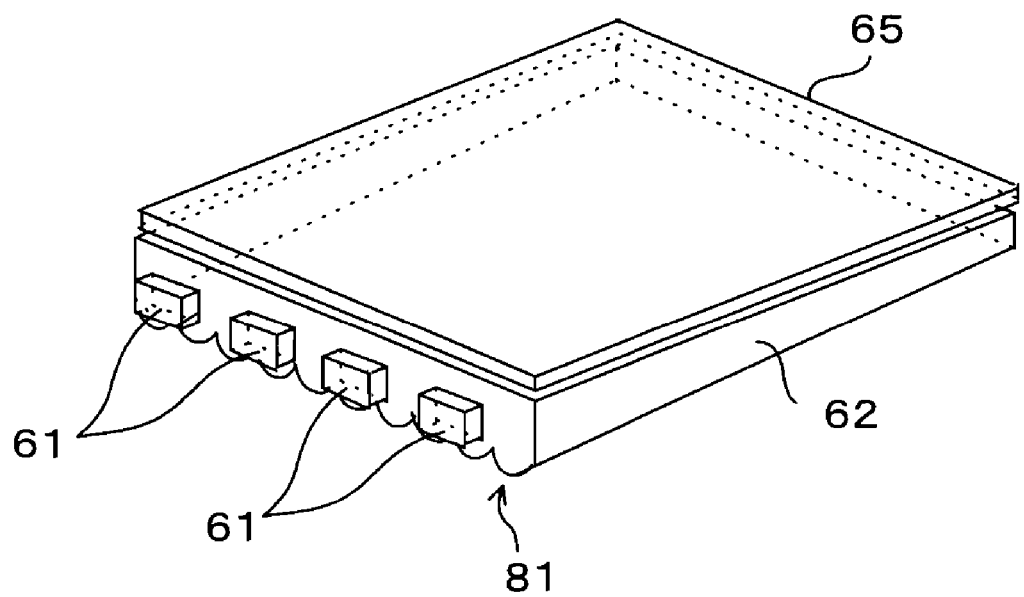
FIG. 16 is a perspective view showing a lighting device in which a cylindrical lens array is provided on a back surface side of a light-guiding plate.

Further, as shown in FIG. 16, a cylindrical lens array 81 may be provided on a back surface side (side of the other surface which is opposed to the light emitting surface) of the light-guiding plate 62. The cylindrical lens array 81 is disposed such that the axis of the cylindrical lenses is parallel to the length direction (direction vertical to the edge surface which the LEDs 61 are arranged) of the light-guiding plate 62. Curved surfaces of the cylindrical lenses constituting the cylindrical lens array 81 are preferably aspheric surfaces, but may also be spherical surfaces. Light emitted from the LED 61 is dispersed by the cylindrical lens array 81 when it proceeds in the light-guiding plate 62, and the uniformity of light illuminating the liquid crystal panel is further improved.

(Second Embodiment)

A second embodiment will be described below. The embodiment is different from the first embodiment in LED and DOE arrangements. Other components are basically similar to those of the first embodiment, and thus description of portions similar to those of the first embodiment will be omitted.

Figure 17:
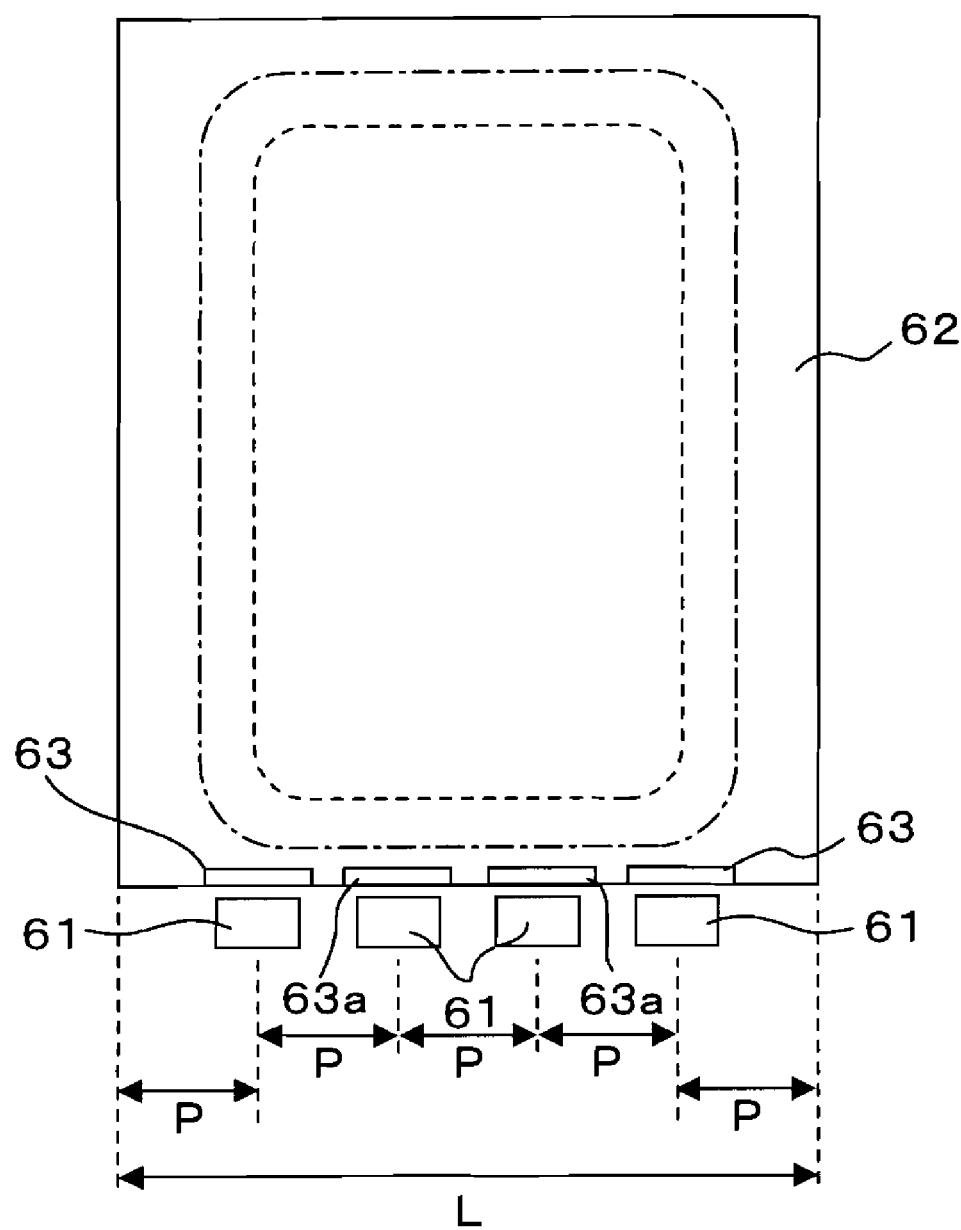
FIG. 17 is a schematic diagram showing a preferable arrangement of the LEDs in terms of enhancing brightness in a center portion of the lighting device.

In the first embodiment described above, the positions of the LEDs are determined in terms of uniformizing the distribution of brightness within a surface. However, the LEDs 61 may be disposed as shown in FIG. 17 in terms of enhancing the brightness of the center portion. In FIG. 17, L represents the width of the light-guiding plate 62, and P represents the interval between the centers of the LEDs 61. In this lighting device, the interval between the edge of the light-guiding plate 62 and the center of the LED 61 disposed near the edge is P.

Since the interval from the edge of the light-guiding plate 62 to the LED 61 is large in the lighting device in which the LEDs 61 are disposed as shown in FIG. 17, the brightness in the center portion (portion inside the dotted line of FIG. 17) becomes higher but the brightness in the peripheral portion (portion outside the dashed-dotted line of FIG. 17) becomes lower, if each DOE 63 has the same diffusion characteristics.

Figure 18:
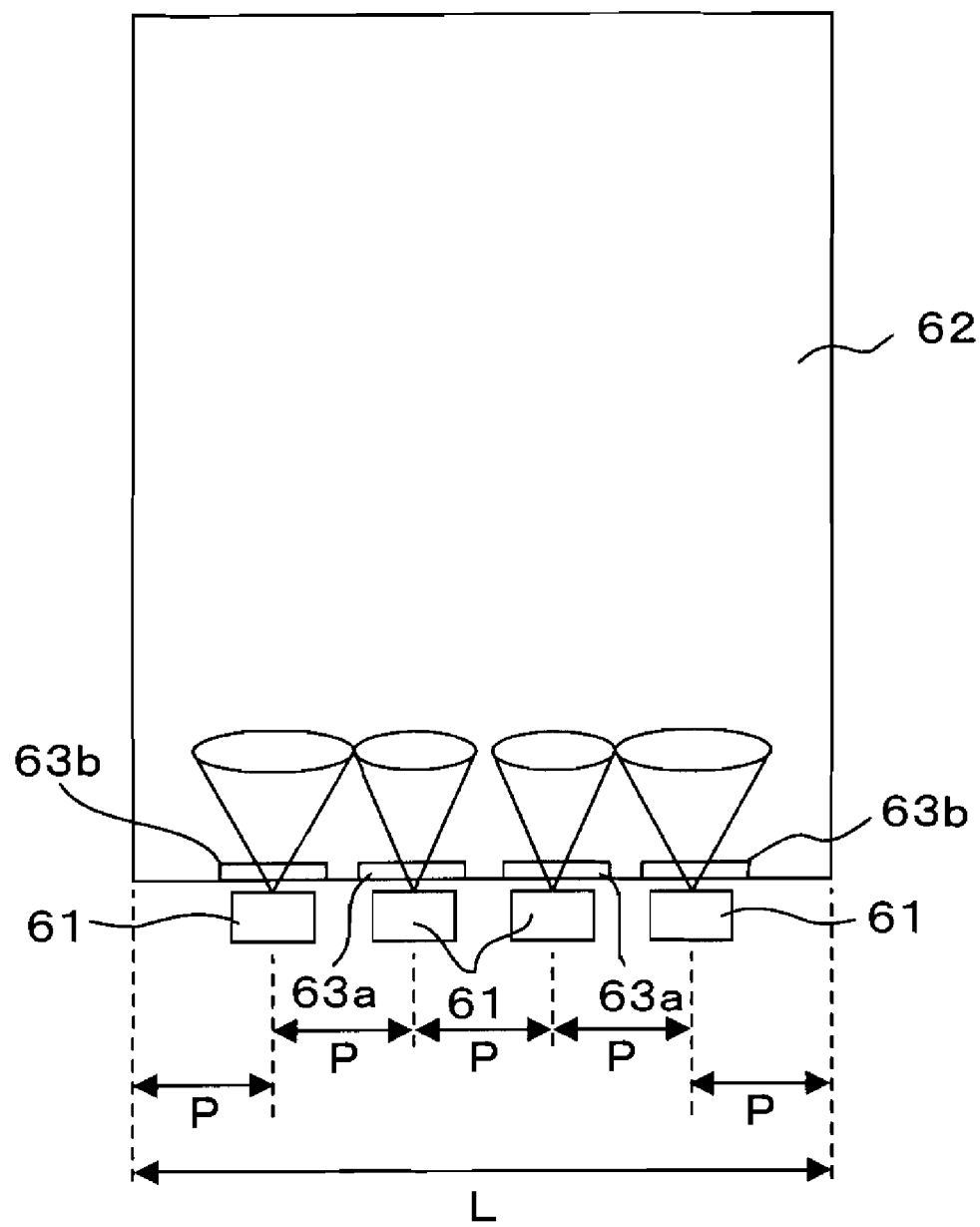
FIG. 18 is a schematic diagram showing arrangements of LEDs and DOEs of a lighting device according to a second embodiment, and the diffusion angle of each DOE.

Accordingly, in this embodiment, the diffusion angle of the DOEs 63b disposed near the edge is set larger than the diffusion angle of the DOEs 63a disposed near the center, as shown in FIG. 18. Thus, light diffracted and diffused by the DOEs 63b can reach the peripheral portion of the light-guiding plate 62, and the brightness in the peripheral portion can be improved without substantially degrading the brightness in the center portion.

(Third Embodiment)

A third embodiment will be described below. The embodiment is different from the first embodiment in LED and DOE arrangements. Other components are basically similar to those of the first embodiment, and thus description of portions similar to those of the first embodiment will be omitted.

Figure 19:
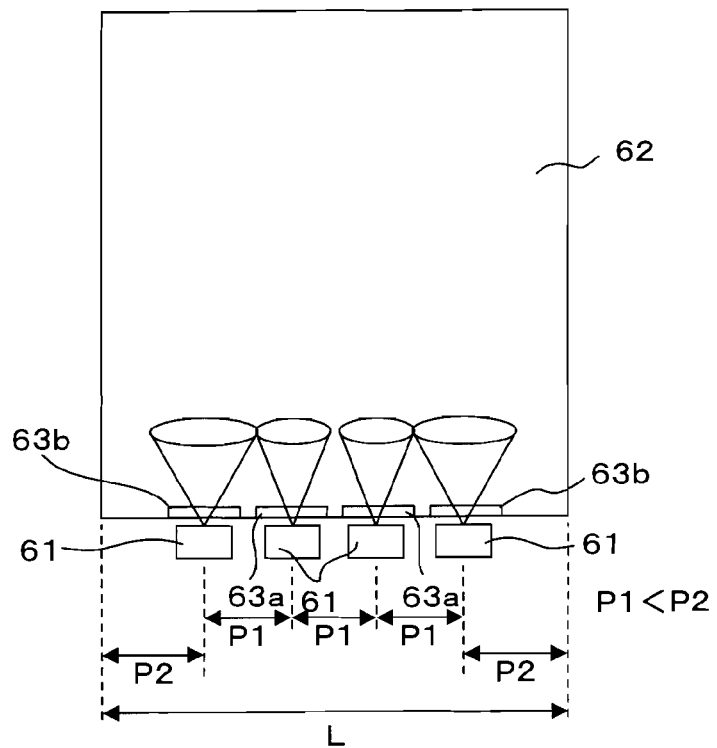
FIG. 19 is a schematic diagram showing arrangements of LEDs and DOEs according of a lighting device to a third embodiment, and the diffusion angle of each DOE.

FIG. 19 is a schematic diagram showing a lighting device according to the third embodiment. In FIG. 19, L represents the width of the light-guiding plate 62, and P1 represents the interval between the centers of the LEDs 61. In the lighting device, the interval between the edge of the light-guiding plate 62 and the center of the LED 61 disposed near the edge is represented by P2 (where P1<P2).

By collectively arranging four LEDs 61 in the center portion of the light-guiding plate 62 as shown in FIG. 19, the area required for arranging the LEDs 61 can be reduced, and the packaging density of parts in a device such as a mobile phone can be improved. Note that, if the diffusion angles of the four DOEs disposed to face the LEDs 61 are the same, this configuration results in a larger brightness difference between the center portion and the peripheral portion of the lighting device.

Accordingly, in this embodiment, the diffusion angle of the DOEs 63b disposed near the edge is set larger than the diffusion angle of the DOEs 63a disposed near the center. Thus, the brightness difference between the center portion and the peripheral portion is reduced, and a liquid crystal display device with a good visibility can be achieved.

(Fourth Embodiment)

A fourth embodiment will be described below. The embodiment is different from the first embodiment in LED and DOE arrangements. Other components are basically similar to those of the first embodiment, and thus description of portions similar to those of the first embodiment will be omitted.

Figure 20:
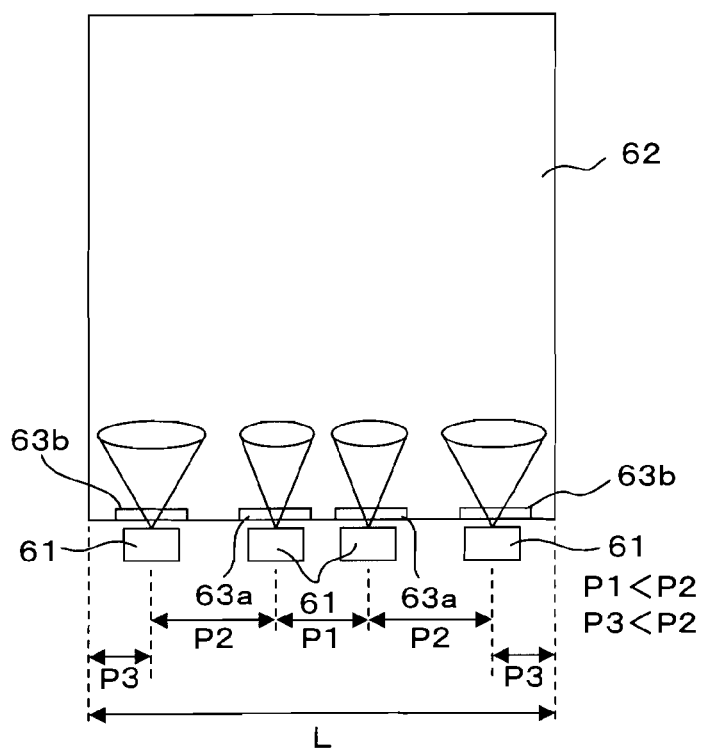
FIG. 20 is a schematic diagram showing arrangements of LEDs and DOEs of a lighting device according to a fourth embodiment, and the diffusion angle of each DOE.

FIG. 20 is a schematic diagram showing a lighting device according to the fourth embodiment. In FIG. 20, L represents the width of the light-guiding plate 62, P1 represents the interval between the centers of the two LEDs 61 disposed near the center, P2 represents the interval between the center of the LED 61 disposed near the center and the center of the LED 61 disposed near the edge, and P3 represents the interval between the center of the LED 61 disposed near the edge and the edge of the light-guiding plate 62. Note that P1 is set smaller than P2 (P1<P2), and P3 is set smaller than P2 (P3<P2).

By arranging the four LEDs 61 as shown in FIG. 20, the brightness in both the center portion and the peripheral portion can be enhanced. Note that, if the diffusion angles of the four DOEs disposed to face the LEDs 61 are the same, there may appear a low-brightness portion between the center portion and the peripheral portion.

Accordingly, in this embodiment as well, the diffusion angle of the DOEs 63b disposed near the edge is set larger than the diffusion angle of the DOEs 63a disposed near the center. Thus, the low-brightness portion does not appear between the center portion and the peripheral portion, and a liquid crystal display device with a good visibility can be achieved.

In the embodiments above note that description has been given of the cases where the lighting device is disposed on a back surface side of a liquid crystal panel to be used as a backlight. However, the present invention may be applied to a front light disposed on a front surface side of the liquid crystal panel.

In the embodiments above, description has been given of the cases where the DOEs and the light-guiding plate are formed integrally. However, the DOE and the light-guiding plate may be manufactured separately to dispose the DOEs in the edge surface of the light-guiding plate.

Further, in the embodiments above, description has been given of the cases where the DOEs are formed by a binary concave and convex pattern. However, the DOE may be formed by a ternary or quaternary concave and convex pattern (a concave and convex pattern in which the level differences are uniform).

Furthermore, the number of light sources is four in the embodiments described above. However, it is needless to say that the number of light sources of the lighting device of the present invention is not limited to four. The present invention may be applied to a lighting device in which the number of light sources is three or more.

What is claimed is:

1. A lighting device comprising:
a light-guiding plate by which light entering from an edge surface is outputted in a thickness direction of the light-guiding plate;
a plurality of light sources disposed near the edge surface of the light-guiding plate, aligned in a width direction of the light-guiding plate and configured to emit light in a length direction of the light-guiding plate; and
a plurality of diffractive optical elements disposed in the edge surface of the light-guiding plate to face the light sources, respectively, wherein
among the plurality of diffractive optical elements, the diffusion angle of the diffractive optical elements which are disposed near the center differs from the diffusion angle of the diffractive optical elements which are disposed near the edge, and wherein
the diffractive optical elements are formed of a concave and convex pattern provided in the edge surface of the light-guiding plate and distributed in two-dimensional directions which consist of the width direction of the light-guiding plate and the thickness direction of the light-guiding plate, and level differences between an uppermost surface and a lowermost surface of the concave and convex pattern in the length direction of the light-guiding plate are uniform, and wherein
the diffusion angle of the diffractive optical elements disposed near the center is smaller than the diffusion angle of the diffractive optical elements disposed near the edge.

2. The lighting device according to claim 1, wherein, when the number of the light sources is represented by n and the width of the light-guiding plate is represented by L, an interval P between the centers of each adjacent two of the plurality of light sources is set to L/n, and an interval between the center of the light source disposed near the edge and each edge of the light-guiding plate is set to P/2.

3. The lighting device according to claim 1, wherein, when the number of the light sources is represented by n and the width of the light-guiding plate is represented by L, an interval P between the centers of each adjacent two of the plurality of light sources is set to L/(n+1), and an interval between the center of the light source disposed near the edge and each edge of the light-guiding plate is set to P.

4. The lighting device according to claim 1, wherein an interval between the centers of each adjacent two of the plurality of light sources is P1, and an interval between the center of the light source disposed near the edge and each edge of the light-guiding plate is P2 (where P1<P2).

5. The lighting device according to claim 1, wherein an interval between the centers of each adjacent two of the plurality of light sources disposed the center is P1, an interval between the center of the light source disposed near the center and the center of the light source disposed near the edge is P2 (where P1<P2), and an interval between the center of the light source disposed near the edge and each edge of the light-guiding plate is P3 (where P3<P2).

6. The lighting device according to claim 1, wherein the concave and convex pattern of the diffractive optical elements disposed near the center has an identical pitch and a different pattern shape with respect to the concave and convex pattern of the diffractive optical elements disposed near the edge.

7. The lighting device according to claim 1, wherein the concave and convex pattern of the diffractive optical elements disposed near the center has an identical pattern shape and a different pitch with respect to the concave and convex pattern of the diffractive optical elements disposed near the edge.

8. The lighting device according to claim 1, wherein a cylindrical lens array is provided to a surface which is opposed to a light emitting side of the light-guiding plate.

9. A liquid crystal display device comprising:
a liquid crystal panel constituted by sealing a liquid crystal between two substrates; and
a lighting device for irradiating the liquid crystal panel with light, wherein
the lighting device comprises:
a light-guiding plate by which light entering from an edge surface is outputted in a thickness direction;
a plurality of light sources disposed near the edge surface of the light-guiding plate, aligned in a width direction of the light-guiding plate and configured to emit light in a length direction of the light-guiding plate; and
a plurality of diffractive optical elements disposed in the edge surface of the light-guiding plate to face the light sources, respectively, among the plurality of diffractive optical elements, the diffusion angle of the diffractive optical elements disposed near the center differing from the diffusion angle of the diffractive optical elements disposed near the edge, and wherein the diffractive optical elements are formed of a concave and convex pattern provided in the edge surface of the light-guiding plate and distributed in two-dimensional directions which consist of the width direction of the light-guiding plate and the thickness direction of the light-guiding plate, and level differences between an uppermost surface and a lowermost surface of the concave and convex pattern in the length direction of the light-guiding plate are uniform, and wherein the diffusion angle of the diffractive optical elements disposed near the center is smaller than the diffusion angle of the diffractive optical elements disposed near the edge.

* * * * *